US012494860B2

(12) United States Patent
Takemura (10) Patent No.: US 12,494,860 B2
(45) Date of Patent: Dec. 9, 2025

(54) WAVELENGTH MULTIPLEXING DEVICE AND WAVELENGTH MULTIPLEXING METHOD

(71) Applicant: NEC Corporation, Tokyo (JP)

(72) Inventor: Takeshi Takemura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 18/268,865

(22) PCT Filed: Mar. 25, 2021

(86) PCT No.: PCT/JP2021/012625
§ 371 (c)(1),
(2) Date: Jun. 21, 2023

(87) PCT Pub. No.: WO2022/201450
PCT Pub. Date: Sep. 29, 2022

(65) Prior Publication Data
US 2024/0297727 A1    Sep. 5, 2024

(51) Int. Cl.
*H04J 14/02*     (2006.01)
*H04B 10/079*   (2013.01)

(52) U.S. Cl.
CPC ........ *H04J 14/0298* (2013.01); *H04B 10/079* (2013.01); *H04J 14/02* (2013.01)

(58) Field of Classification Search
CPC .... H04B 10/1149; H04J 14/0298; H04J 14/02
USPC .......................................................... 398/79
See application file for complete search history.

(56) References Cited

U.S. PATENT DOCUMENTS

| 9,831,899 B1 * | 11/2017 | Boghrat ................ H03F 1/3247 |
| 2013/0121691 A1 | 5/2013 | Oda et al. |
| 2018/0034544 A1 | 2/2018 | Sato |
| 2019/0253139 A1 | 8/2019 | Satou |

(Continued)

FOREIGN PATENT DOCUMENTS

| EP | 1128579 A9 * | 7/2002 | ....... H04B 10/07955 |
| JP | 2006-345372 A | 12/2006 | |

(Continued)

OTHER PUBLICATIONS

Matan et al; 16-channel O-band silicon-photonic wavelength division multiplexer with a 1 nm channel spacing, Oct. 2022; Optics Express; pp. 1-11. (Year: 2022).*

(Continued)

*Primary Examiner* — Amritbir K Sandhu (57) ABSTRACT

A wavelength multiplexing device according to the present disclosure includes a wavelength multiplexer for causing input light inputted from a plurality of input ports for receiving optical signals to pass within a passband determined by a set center frequency and a set bandwidth, and outputting the light from an output port; an optical monitor for measuring optical power of the optical signals for each optical frequency and generating optical waveform information; a calculator for calculating a main signal center frequency which is the center frequency of the optical signals and a main signal bandwidth which is the bandwidth of the optical signals; and a controller for setting the set center frequency to the main signal center frequency and setting the set bandwidth to the main signal bandwidth.

9 Claims, 4 Drawing Sheets

(56) References Cited

U.S. PATENT DOCUMENTS

| | | | |
|---|---|---|---|
| 2020/0209108 A1 | 7/2020 | Deng et al. | |
| 2020/0358534 A1 | 11/2020 | Ootaki | |
| 2023/0103485 A1* | 4/2023 | Aksu | A61B 17/8076 |
| | | | 424/422 |
| 2023/0403485 A1* | 12/2023 | Yoshino | H04B 10/032 |
| 2024/0297727 A1* | 9/2024 | Takemura | H04J 14/0298 |
| 2025/0007610 A1* | 1/2025 | Kaneko | H04B 10/27 |

FOREIGN PATENT DOCUMENTS

| | | | | |
|---|---|---|---|---|
| JP | 5899849 B2 | | 4/2016 | |
| JP | 2019054404 A | * | 4/2019 | ......... H04B 10/0775 |
| JP | 2020-145754 A | | 9/2020 | |
| JP | 2021-502724 A | | 1/2021 | |
| KR | 20130079272 A | * | 7/2013 | .......... H04J 14/0257 |
| WO | WO-2015070284 A1 | * | 5/2015 | ........... H04L 9/0869 |
| WO | 2018/051935 A1 | | 3/2018 | |
| WO | 2019/151067 A1 | | 8/2019 | |
| WO | WO-2020073202 A1 | * | 4/2020 | .......... H04J 14/0221 |
| WO | WO-2021131170 A1 | * | 7/2021 | ........... H04B 10/291 |

OTHER PUBLICATIONS

International Search Report for PCT Application No. PCT/JP2021/012625, mailed on Jun. 15, 2021.

English translation of Written opinion for PCT Application No. PCT/JP2021/012625, mailed on Jun. 15, 2021.

\* cited by examiner

WAVELENGTH MULTIPLEXING DEVICE AND WAVELENGTH MULTIPLEXING METHOD

This application is a National Stage Entry of PCT/JP2021/012625 filed on Mar. 25, 2021, the contents of all of which are incorporated herein by reference, in their entirety.

TECHNICAL FIELD

The present invention relates to a wavelength multiplexing device and a wavelength multiplexing method, more particularly to a wavelength multiplexing device and a wavelength multiplexing method that are used for an optical submarine cable system.

BACKGROUND ART

An optical submarine cable system connecting continents to one another via optical fibers is a key factor as an infrastructure that supports an international communication network. The optical submarine cable system includes a submarine cable that accommodates optical fibers, a submarine repeater that includes an optical amplifier mounted thereon, a submarine splitting device that splits an optical signal, a terminal device that is installed in a land station, and the like. The terminal device includes a wavelength multiplexing device (Wavelength Multiplexing Equipment: WME), a submarine line termination device (Submarine Line Termination Equipment: SLTE), a system monitoring device, and the like.

An example of such a terminal device to be used in the optical submarine cable system is described in PTL 1. The related terminal device described in PTL 1 includes a submarine line termination device SLTE and a monitoring system. The submarine line termination device SLTE includes a plurality of transponders TPD, a dummy light source, a multiplexing unit MUX, and an optical channel monitor OCM.

The multiplexing unit MUX and the optical channel monitor OCM receive transponder wavelength information (filter wavelength information) and dummy light wavelength information from the monitoring system when the submarine line termination device SLTE is activated and the number of wavelengths is increased.

The multiplexing unit MUX is a wavelength selective switch (WSS), and an input side thereof is an active filter. Further, there is a configuration in which the active filter can be controlled to be a filter shape that causes a signal to pass therethrough, according to the transponder wavelength information from the monitoring system. In other words, when the transponder wavelength information is acquired from the monitoring system, the active filter of the multiplexing unit MUX is controlled to cause a signal to pass therethrough. Further, the optical channel monitor OCM has an optical spectrum measurement function, and thus checks an optical power measurement value of a wavelength slot equivalent to a designated wavelength received from the monitoring system.

Specifically, the related terminal device has a configuration in which the optical channel monitor OCM acquires the transponder wavelength information and the dummy light wavelength information from the monitoring system and checks the optical power measurement value of the wavelength slot equivalent to the designated wavelength received from the monitoring system.

With this configuration, it is assumed that the related terminal device can detect presence or absence of a signal for each wavelength by using the optical channel monitor OCM and can monitor a transmission path for transmitting an optical wavelength multiplexing signal in a satisfactory manner.

Further, examples of the related art include a technique described in PTL 2.

CITATION LIST

Patent Literature

PTL1: International Patent Publication No. WO2018/051935

PTL2: Japanese Unexamined Patent Application Publication No. 2006-345372

SUMMARY OF INVENTION

Technical Problem

In the optical submarine cable system, a wavelength multiplexing optical signal acquired by multiplexing optical signals having different wavelengths is transmitted from the terminal device installed in a land station, and thus communication is performed. Further, as in the related terminal device described above, when a transponder that transmits and receives each of optical signals having wavelengths is installed or additionally installed, it is required to set, from a system monitoring device, filter characteristics of each of input ports of the wavelength multiplexing device (WME) into which the transponder is inserted.

For example, the optical submarine cable system currently has a configuration in which 16 fiber pairs are used and 120 wavelengths are multiplexed per fiber pair, and hence approximately 2,000 transponders are used per land station. Further, an operator performs work for registering characteristics of light transmitted and received by each of the transponders (a center frequency, a bandwidth, and the like) in the system monitoring device, in order to set filter characteristics of each of the input ports of the wavelength multiplexing device (WME).

In recent years, as a capacity of the optical submarine cable system has been increased, the number of fiber pairs has further been increased, and hence the number of transponders to be used also tends to be increased. Therefore, the number of work steps for registering characteristics of the transponders is increased.

Thus, in the optical submarine cable system, there arises a problem that a setting work amount in the terminal device is increased as the capacity is increased.

An object of the present invention is to provide a wavelength multiplexing device and a wavelength multiplexing method that solve a problem of increasing a setting work amount in the terminal device as the capacity is increased in the optical submarine cable system.

Solution to Problem

A wavelength multiplexing device according to the present invention includes a wavelength multiplexing means for causing input light being input from each of a plurality of input ports receiving an optical signal, to pass in a pass band determined by a set center frequency and a set bandwidth and outputting the light from an output port, an optical monitoring means for measuring optical power of the optical signal for each optical frequency and generating optical waveform information, a calculation means for calculating a main signal center frequency being a center frequency of the optical signal and a main signal bandwidth being a bandwidth of the optical signal from the optical waveform information, and a control means for setting the set center frequency to the main signal center frequency and setting the set bandwidth to the main signal bandwidth.

A wavelength multiplexing method according to the present invention includes measuring optical power of an optical signal for each optical frequency and generating optical waveform information, calculating a main signal center frequency being a center frequency of the optical signal and a main signal bandwidth being a bandwidth of the optical signal from the optical waveform information, and, when causing the optical signal to pass in a pass band determined by a set center frequency and a set bandwidth and to be multiplexed, setting the set center frequency to the main signal center frequency and setting the set bandwidth to the main signal bandwidth.

Advantageous Effects of Invention

By the wavelength multiplexing device and the wavelength multiplexing method according to the present invention, an increase of a setting work amount in the terminal device is able to be avoided even when a capacity of the optical submarine cable system is increased.

EXAMPLE EMBODIMENT

With reference to the drawings, example embodiments of the present invention are explained below.

First Example Embodiment

Figure 1:
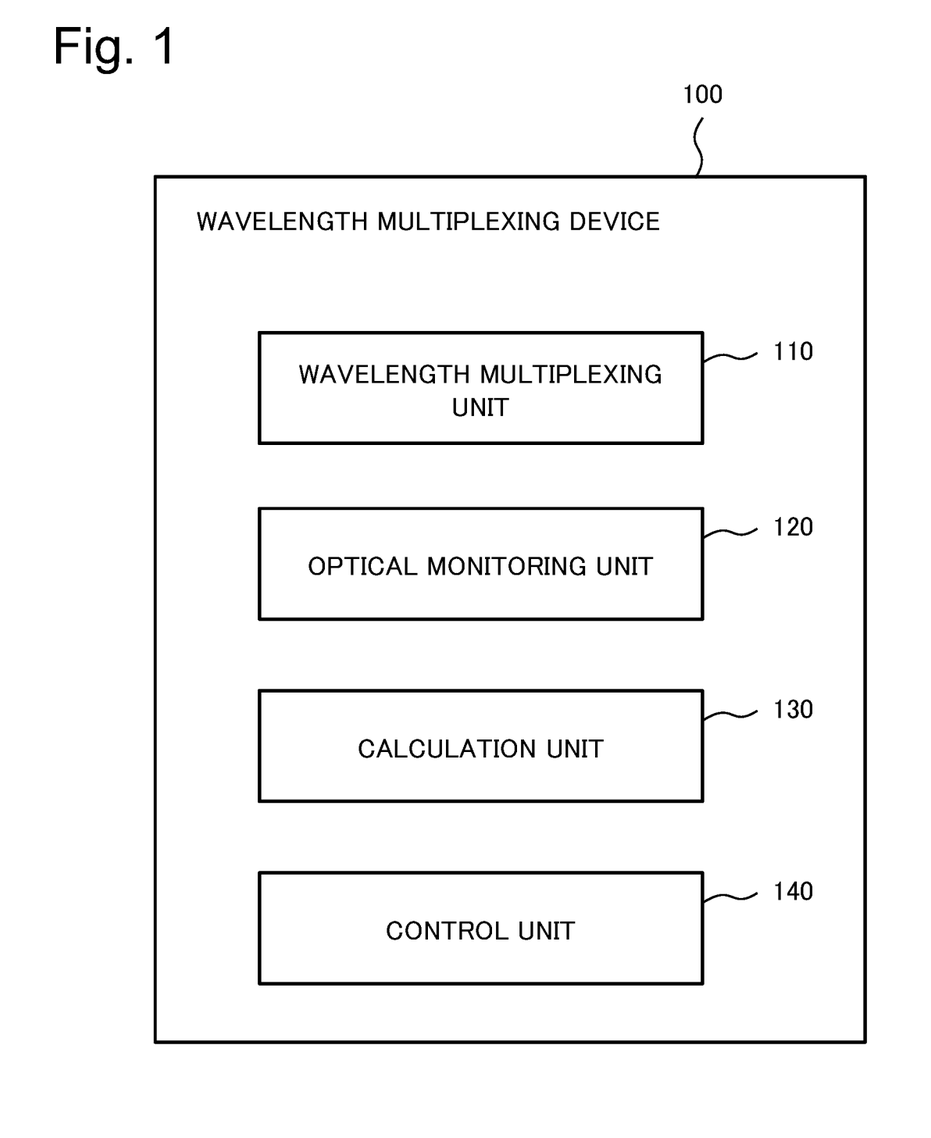
FIG. 1 is a block diagram illustrating a configuration of a wavelength multiplexing device according to a first example embodiment of the present invention.

FIG. 1 is a block diagram illustrating a configuration of a wavelength multiplexing device 100 according to a first example embodiment of the present invention. The wavelength multiplexing device 100 includes a wavelength multiplexing unit (wavelength multiplexing means) 110, an optical monitoring unit (optical monitoring means) 120, a calculation unit (calculation means) 130, and a control unit (control means) 140. The wavelength multiplexing device 100 is suitably used in a terminal device constituting an optical submarine cable system.

The wavelength multiplexing unit 110 causes input light that is input from each of a plurality of input ports receiving an optical signal, to pass in a pass band determined by a set center frequency and a set bandwidth, and outputs the light from an output port. The optical monitoring unit 120 measures optical power of the optical signal for each optical frequency and generates optical waveform information. The calculation unit 130 calculates a main signal center frequency being a center frequency of the optical signal and a main signal bandwidth being a bandwidth of the optical signal, from the optical waveform information. Further, the control unit 140 sets the set center frequency to the main signal center frequency, and sets the set bandwidth to the main signal bandwidth.

As described above, in the wavelength multiplexing device 100 according to the present example embodiment, the calculation unit 130 calculates the main signal center frequency and the main signal bandwidth of the optical signal from the optical waveform information acquired by performing measurement by the optical monitoring unit 120. Further, there is a configuration in which the control unit 140 sets a pass band of the wavelength multiplexing unit 110, based on the main signal center frequency and the main signal bandwidth that are calculated. In other words, in the wavelength multiplexing device 100, setting of the wavelength multiplexing unit 110 can be performed automatically. Therefore, simply by inserting the transponder into the input port of the wavelength multiplexing unit 110 (plug-in), a state in which the optical signal can be conducted through the wavelength multiplexing unit 110 can be established, and the optical signal can be monitored.

Thus, there is no need for an operator to register characteristics (the center frequency, the bandwidth, and the like of the optical signal to be transmitted and received) of the transponder to be connected to the wavelength multiplexing unit 110, in a system monitoring device or the like. As a result, by the wavelength multiplexing device 100 according to the present example embodiment, an increase of a setting work amount in the terminal device can be avoided even when the capacity of the optical submarine cable system is increased.

The wavelength multiplexing unit 110 may typically be configured to include a wavelength selectable switch (WSS). Herein, a liquid crystal element such as a liquid crystal on silicon (LCOS) is used as a spatial light modulation element included in the wavelength selectable switch (WSS), and thus the pass band can be changed. With this configuration, the wavelength selectable switch (WSS) can be caused to function as an active filter.

Typically, an optical channel monitor (OCM) may be used as the optical monitoring unit 120. As an optical channel monitoring method, there has been known a method of measuring optical power for each optical frequency by sweeping an optical band pass filter with a narrow frequency slot and performing conversion to an electric signal by a photodetector.

Next, a wavelength multiplexing method according to the present example embodiment is explained.

In the wavelength multiplexing method according to the present example embodiment, first, optical power of the optical signal is measured for each optical frequency and the optical waveform information is generated. Next, a main signal center frequency being a center frequency of the optical signal and a main signal bandwidth being a bandwidth of the optical signal are calculated from the optical waveform information. Further, when the optical signal is caused to pass in a pass band determined by a set center frequency and a set bandwidth and is multiplexed, the set center frequency is set to the main signal center frequency, and the set bandwidth is set to the main signal bandwidth.

In this manner, the wavelength multiplexing method according to the present example embodiment has a configuration in which the main signal center frequency and the main signal bandwidth of the optical signal are calculated from the measured optical waveform information and the optical signal is caused to pass in the pass band determined by the main signal center frequency and the main signal bandwidth and is multiplexed. Thus, setting of the pass band of the optical signal can be performed automatically without depending on registration work by an operator.

As explained above, by the wavelength multiplexing device 100 and the wavelength multiplexing method according to the present example embodiment, an increase of a setting work amount in the terminal device can be avoided even when the capacity of the optical submarine cable system is increased.

Second Example Embodiment

Figure 2:
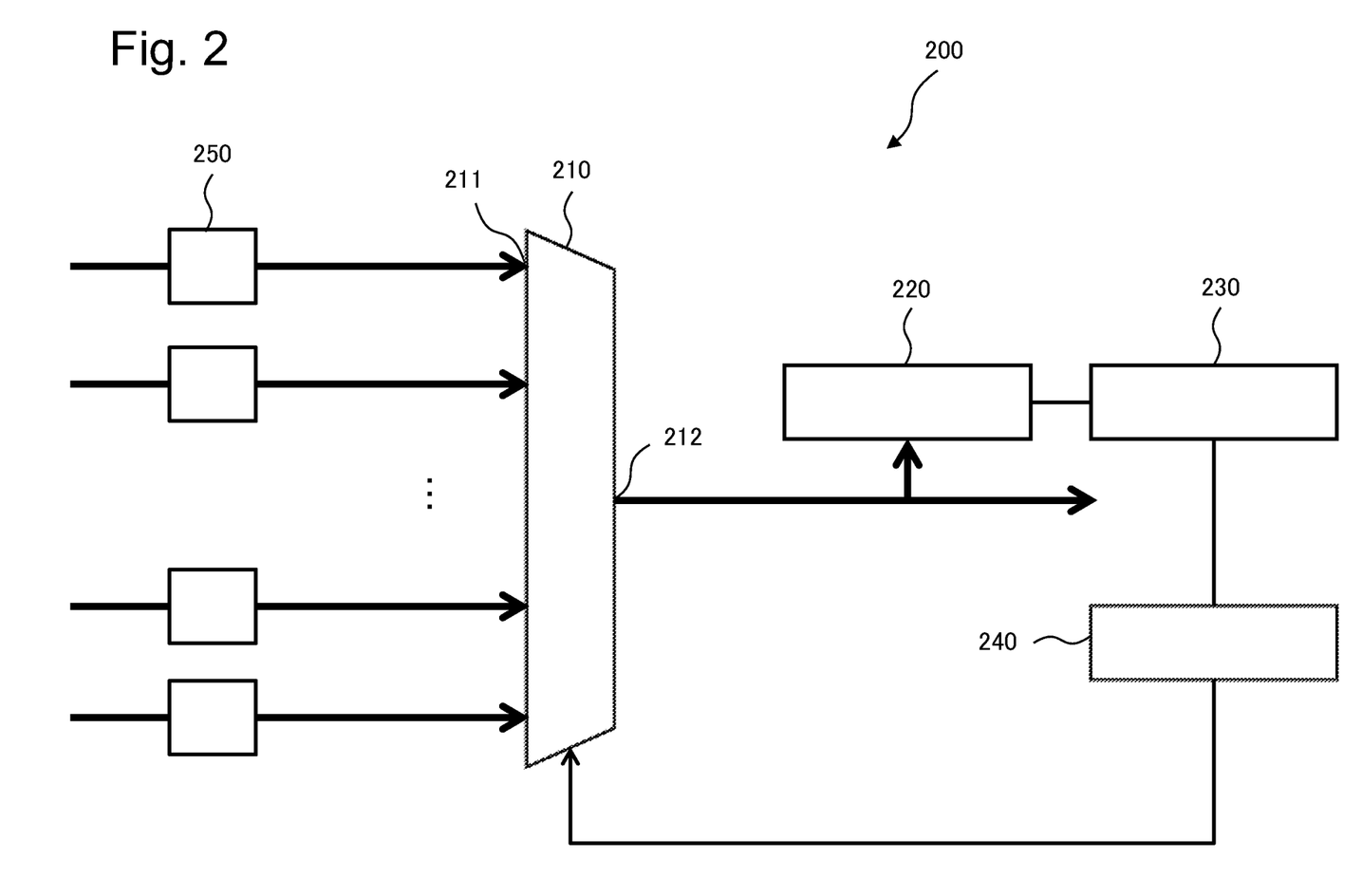
FIG. 2 is a block diagram illustrating a configuration of a wavelength multiplexing device according to a second example embodiment of the present invention.

Next, a second example embodiment of the present invention is explained. FIG. 2 illustrates a configuration of a wavelength multiplexing device 200 according to the present example embodiment. The wavelength multiplexing device 200 includes a wavelength multiplexing unit (wavelength multiplexing means) 210, an optical monitoring unit (optical monitoring means) 220, a calculation unit (calculation means) 230, and a control unit (control means) 240. The wavelength multiplexing device 200 is suitably used in a terminal device constituting an optical submarine cable system.

The wavelength multiplexing unit 210 causes input light that is input from each of a plurality of input ports 211 receiving an optical signal, to pass in a pass band determined by a set center frequency and a set bandwidth, and outputs the light from an output port 212. The optical monitoring unit 220 measures optical power of the optical signal for each optical frequency and generates the optical waveform information. The calculation unit 230 calculates a main signal center frequency being a center frequency of the optical signal and a main signal bandwidth being a bandwidth of the optical signal, from the optical waveform information. Further, the control unit 240 sets the set center frequency to the main signal center frequency, and sets the set bandwidth to the main signal bandwidth.

The configuration described above is similar to the configuration of the wavelength multiplexing device 100 according to the first example embodiment. The wavelength multiplexing device 200 according to the present example embodiment is configured to further include an optical detection unit (optical detection means) 250. Herein, the optical detection unit 250 generates an optical detection signal when an input of the optical signal is detected.

Herein, when the optical detection signal is received, the control unit 240 cancels limits of the set center frequency and of the set bandwidth, and extends the pass band to a maximum pass band within the permissible range. Specifically, for example, for an input port from which an input of the optical signal is detected by the optical detection unit 250, an active filter of the wavelength selectable switch (WSS) included in the wavelength multiplexing unit 210 is in a fully opened state. With this, even before the pass band of the wavelength multiplexing unit 210 is set to a predetermined band determined by characteristics of the optical signal, the optical signal can pass through the wavelength multiplexing unit 210 and arrive at the optical monitoring unit 220.

The optical monitoring unit 220 generates first optical waveform information being the optical waveform information from the optical signal that passes through the wavelength multiplexing unit 210 in the maximum pass band.

In this case, the calculation unit 230 calculates a first main signal center frequency being the main signal center frequency and a first main signal bandwidth being the main signal bandwidth from the first optical waveform information. Further, the control unit 240 may be configured to set the set center frequency to the first main signal center frequency and set the set bandwidth to the first main signal bandwidth.

With this configuration, by the wavelength multiplexing device 200, setting of the wavelength multiplexing unit 210 can be performed automatically without depending on registration work by an operator. Therefore, simply by inserting the transponder into the input port of the wavelength multiplexing unit 210 (plug-in), a state in which the optical signal can be conducted through the wavelength multiplexing unit 210 can be established, and the optical signal can be monitored.

Next, an operation of the calculation unit 230 is further explained in detail.

Figure 3:
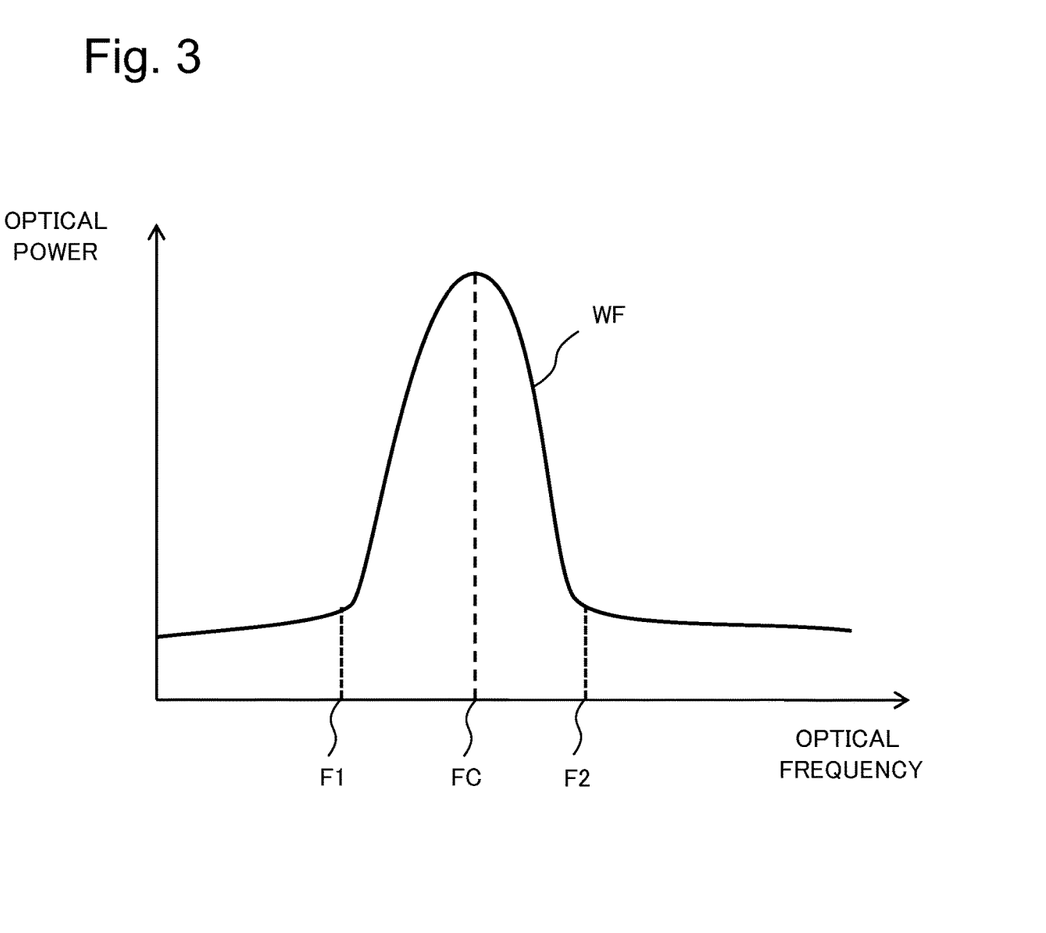
FIG. 3 is a diagram illustrating optical waveform information measured by an optical monitoring unit included in the wavelength multiplexing device according to the second example embodiment of the present invention.

FIG. 3 illustrates an example of the optical waveform information (first optical waveform information) measured by the optical monitoring unit 220. Typically, the optical monitoring unit 120 is an optical channel monitor (OCM), and measures optical power for each optical frequency by sweeping an optical band pass filter with a narrow frequency slot (for example, a width of 6.25 GHZ) and performing conversion to an electric signal by a photodetector.

The calculation unit 230 derives a rising frequency F1 and a falling frequency F2 in an optical waveform (spectrum waveform) WF of the optical signal from the optical waveform information, and calculates a main signal center frequency FC and a main signal bandwidth from the rising frequency F1 and the falling frequency F2. Specifically, for example, when an absolute value indicating an optical power difference between adjacent frequency slots exceeds a predetermined threshold value, the calculation unit 230 determines an optical frequency in the frequency slot as the rising frequency F1 or the falling frequency F2. Such a function of the calculation unit 230 can be achieved by firmware, and for example, may be implemented by using a filed programmable gate array (FPGA) or the like.

Next, a wavelength multiplexing method according to the present example embodiment is explained.

In the wavelength multiplexing method according to the present example embodiment, first, optical power of an optical signal is measured for each optical frequency and optical waveform information is generated. Next, a main signal center frequency being a center frequency of the optical signal and a main signal bandwidth being a bandwidth of the optical signal are calculated from the optical waveform information. Further, when the optical signal is caused to pass in the pass band determined by a set center frequency and a set bandwidth and is multiplexed, the set center frequency is set to the main signal center frequency, and the set bandwidth is set to the main signal bandwidth.

The configuration described above is similar to the wavelength multiplexing method in the first example embodiment. The wavelength multiplexing method according to the present example embodiment further includes generating an optical detection signal when an input of the optical signal is detected, and cancelling limits of the set center frequency and of the set bandwidth, thereby extending the pass band to the maximum pass band within the permissible range when the optical detection signal is received. Herein, it is assumed that the generating the optical waveform information described above includes generating first optical waveform information being the optical waveform information from the optical signal that has passed in the maximum pass band.

In this case, the calculating the main signal center frequency and the main signal bandwidth, which is described above, may include calculating a first main signal center frequency being the main signal center frequency and a first main signal bandwidth being the main signal bandwidth from the first optical waveform information. Further, the setting the set center frequency to the main signal center frequency, which is described above, may include setting the set center frequency to the first main signal center frequency. Similarly, the setting the set bandwidth to the main signal bandwidth, which is described above, may include setting the set bandwidth to the first main signal bandwidth.

Further, the calculating the main signal center frequency and the main signal bandwidth, which is described above, may include deriving the rising frequency and the falling frequency in the optical waveform of the optical signal from the optical waveform information. Further, calculating the main signal center frequency and the main signal bandwidth from the rising frequency and the falling frequency may also be included.

As explained above, by the wavelength multiplexing device 200 and the wavelength multiplexing method according to the present example embodiment, an increase of a setting work amount in the terminal device can be avoided even when the capacity of the optical submarine cable system is increased.

Third Example Embodiment

Figure 4:
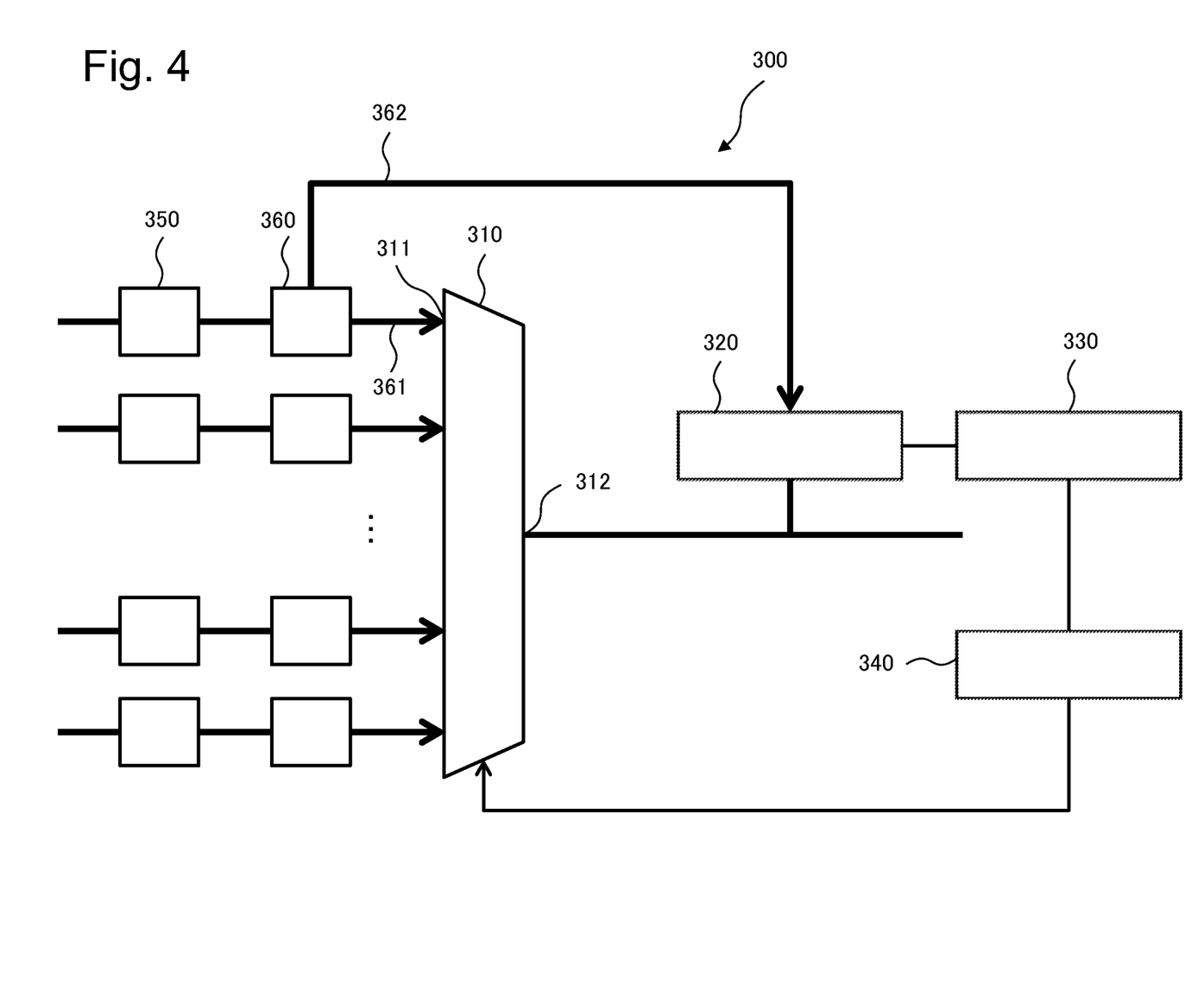
FIG. 4 is a block diagram illustrating a configuration of a wavelength multiplexing device according to a third example embodiment of the present invention.

Next, a third example embodiment of the present invention is explained. FIG. 4 illustrates a configuration of a wavelength multiplexing device 300 according to the present example embodiment. The wavelength multiplexing device 300 includes a wavelength multiplexing unit (wavelength multiplexing means) 310, an optical monitoring unit (optical monitoring means) 320, a calculation unit (calculation means) 330, and a control unit (control means) 340. The wavelength multiplexing device 300 is suitably used in a terminal device constituting an optical submarine cable system.

The wavelength multiplexing unit 310 causes input light that is input from each of a plurality of input ports 311 receiving an optical signal, to pass in a pass band determined by a set center frequency and a set bandwidth, and outputs the light from an output port 312. The optical monitoring unit 320 measures optical power of the optical signal for each optical frequency and generates optical waveform information. The calculation unit 330 calculates a main signal center frequency being the center frequency of the optical signal and a main signal bandwidth being the bandwidth of the optical signal, from the optical waveform information. Further, the control unit 340 sets the set center frequency to the main signal center frequency, and sets the set bandwidth to the main signal bandwidth.

The configuration described above is similar to the configuration of the wavelength multiplexing device 100 according to the first example embodiment. The wavelength multiplexing device 300 according to the present example embodiment is configured to further include an optical detection unit (optical detection means) 350 and an optical switch unit (optical switch means) 360.

The optical detection unit 350 generates an optical detection signal when an input of an optical signal is detected. The optical switch unit 360 switches an optical path of the optical signal between a first optical path 361 toward the wavelength multiplexing unit 310 and a second optical path 362 toward the optical monitoring unit 320. Herein, when the optical detection signal is received, the optical switch unit 360 switches the optical path from the first optical path 361 to the second optical path 362. With this, even before the pass band of the wavelength multiplexing unit 310 is set to a predetermined band determined by characteristics of the optical signal, the optical signal can arrive at the optical monitoring unit 320.

The optical monitoring unit 320 generates second optical waveform information being the optical waveform information from the optical signal that has passed through the second optical path 362.

In this case, the calculation unit 330 calculates a second main signal center frequency being the main signal center frequency and a second main signal bandwidth being the main signal bandwidth from the second optical waveform information. Further, the control unit 340 sets the set center frequency to the second main signal center frequency, and sets the set bandwidth to the second main signal bandwidth. After this, in other words, after the set center frequency is set to the second main signal center frequency and the set bandwidth is set to the second main signal bandwidth, the optical switch unit 360 switches the optical path from the second optical path 362 to the first optical path 361.

With this configuration, the wavelength multiplexing device 300 enables setting of the wavelength multiplexing unit 310 to be performed automatically without depending on registration work by an operator. Therefore, simply by inserting the transponder into the input port of the wavelength multiplexing unit 310 (plug-in), a state in which the optical signal can be conducted through the wavelength multiplexing unit 310 can be established, and the optical signal can be monitored.

The calculation unit 330 included in the wavelength multiplexing device 300 according to the present example embodiment also performs an operation similar to the calculation unit 230 according to the second example embodiment. In other words, as explained by using FIG. 3, the calculation unit 330 derives a rising frequency F1 and a falling frequency F2 in an optical waveform WF of the optical signal from the optical waveform information measured by the optical monitoring unit 320. Further, a main signal center frequency FC and the main signal bandwidth are calculated from the rising frequency F1 and the falling frequency F2. Specifically, for example, when an absolute value indicating an optical power difference between adjacent frequency slots exceeds a predetermined threshold value, the calculation unit 330 determines an optical frequency in the frequency slot as the rising frequency F1 or the falling frequency F2.

Next, a wavelength multiplexing method according to the present example embodiment is explained.

In the wavelength multiplexing method according to the present example embodiment, first, optical power of the optical signal is measured for each optical frequency and the optical waveform information is generated. Next, a main signal center frequency being a center frequency of the optical signal and a main signal bandwidth being a bandwidth of the optical signal are calculated from the optical waveform information. Further, when the optical signal is caused to pass in the pass band determined by a set center frequency and a set bandwidth and is multiplexed, the set center frequency is set to the main signal center frequency, and the set bandwidth is set to the main signal bandwidth.

The configuration described above is similar to the wavelength multiplexing method according to the first example embodiment. The wavelength multiplexing method according to the present example embodiment further includes generating an optical detection signal when an input of the optical signal is detected, and switching an optical path of the optical signal between a first optical path in which the optical signal is cased to pass in the pass band and a second optical path different from the first optical path. Herein, the switching the optical paths, which is described above, includes switching the optical path from the first optical path to the second optical path when the optical detection signal is received. Further, the generating the optical waveform information, which is described above, includes generating second optical waveform information being the optical waveform information from the optical signal that has passed in the second optical path.

In this case, the calculating the main signal center frequency and the main signal bandwidth, which is described above, may include calculating second main signal center frequency being the main signal center frequency and second main signal bandwidth being the main signal bandwidth from the second optical waveform information. Further, the setting the set center frequency to the main signal center frequency, which is described above, may include setting the set center frequency to the second main signal center frequency. Similarly, the setting the set bandwidth to the main signal bandwidth, which is described above, may include setting the set bandwidth to the second main signal bandwidth.

Further, the switching the optical path, which is described above, may include switching the optical path from the second optical path to the first optical path after the set center frequency is set to the second main signal center frequency, and the set bandwidth is set to the second main signal bandwidth.

Further, the calculating the main signal center frequency and the main signal bandwidth, which is described above, may include deriving the rising frequency and the falling frequency in the optical waveform of the optical signal from the optical waveform information. Further, calculating the main signal center frequency and the main signal bandwidth from the rising frequency and the falling frequency may also be included.

As explained above, by the wavelength multiplexing device 300 and the wavelength multiplexing method according to the present example embodiment, an increase of a setting work amount in the terminal device can be avoided even when the capacity of the optical submarine cable system is increased.

Note that, a part or the entirety of the example embodiments described above may be described as in the following supplementary notes, but is not limited to the following.

Supplementary Note 1

A wavelength multiplexing device, including:
a wavelength multiplexing means for causing input light being input from each of a plurality of input ports receiving an optical signal, to pass in a pass band determined by a set center frequency and a set bandwidth and outputting the light from an output port;
an optical monitoring means for measuring optical power of the optical signal for each optical frequency and generating optical waveform information;
a calculation means for calculating a main signal center frequency being a center frequency of the optical signal and a main signal bandwidth being a bandwidth of the optical signal from the optical waveform information; and
a control means for setting the set center frequency to the main signal center frequency and setting the set bandwidth to the main signal bandwidth.

Supplementary Note 2

The wavelength multiplexing device according to Supplementary Note 1, further including
an optical detection means for generating an optical detection signal when an input of the optical signal is detected, wherein,
when the optical detection signal is received, the control means cancels limits of the set center frequency and the set bandwidth and extends the pass band to a maximum pass band within a permissible range, and
the optical monitoring means generates first optical waveform information being the optical waveform information, from the optical signal that passes through the wavelength multiplexing means in the maximum pass band.

Supplementary Note 3

The wavelength multiplexing device according to Supplementary Note 2, wherein
the calculation means calculates a first main signal center frequency being the main signal center frequency and a first main signal bandwidth being the main signal bandwidth from the first optical waveform information, and
the control means sets the set center frequency to the first main signal center frequency, and sets the set bandwidth to the first main signal bandwidth.

Supplementary Note 4

The wavelength multiplexing device according to Supplementary Note 1, further including:
an optical detection means for generating an optical detection signal when an input of the optical signal is detected; and
an optical switch means for switching an optical path of the optical signal between a first optical path toward the wavelength multiplexing means and a second optical path toward the optical monitoring means, wherein,
when the optical detection signal is received, the optical switch means switches the optical path from the first optical path to the second optical path, and
the optical monitoring means generates second optical waveform information being the optical waveform information from the optical signal that passes in the second optical path.

Supplementary Note 5

The wavelength multiplexing device according to Supplementary Note 4, wherein
the calculation means calculates a second main signal center frequency being the main signal center frequency and a second main signal bandwidth being the main signal bandwidth from the second optical waveform information, the control means sets the set center frequency to the second main signal center frequency, and sets the set bandwidth to the second main signal bandwidth, and the optical switch means switches the optical path from the second optical path to the first optical path after the set center frequency is set to the second main signal center frequency, and the set bandwidth is set to the second main signal bandwidth.

Supplementary Note 6

The wavelength multiplexing device according to any one of Supplementary Notes 1 to 5, wherein
the calculation means derives a rising frequency and a falling frequency in an optical waveform of the optical signal from the optical waveform information, and calculates the main signal center frequency and the main signal bandwidth from the rising frequency and the falling frequency.

Supplementary Note 7

The wavelength multiplexing device according to any one of Supplementary Notes 1 to 6, wherein
the wavelength multiplexing means includes a wavelength selectable switch including a spatial light modulation element formed of a liquid crystal element.

Supplementary Note 8

A wavelength multiplexing method, including:
measuring optical power of an optical signal for each optical frequency and generating optical waveform information;
calculating a main signal center frequency being a center frequency of the optical signal and a main signal bandwidth being a bandwidth of the optical signal from the optical waveform information; and
setting a set center frequency to the main signal center frequency and setting a set bandwidth to the main signal bandwidth when the optical signal is caused to pass in a pass band determined by the set center frequency and the set bandwidth and is multiplexed.

Supplementary Note 9

The wavelength multiplexing method according to Supplementary Note 8, further including:
generating an optical detection signal when an input of the optical signal is detected; and
cancelling limits of the set center frequency and the set bandwidth and extending the pass band to a maximum pass band within a permissible range when the optical detection signal is received, wherein
the generating the optical waveform information includes generating first optical waveform information being the optical waveform information from the optical signal that passes in the maximum pass band.

Supplementary Note 10

The wavelength multiplexing method according to Supplementary Note 9, wherein
the calculating the main signal center frequency and the main signal bandwidth includes calculating a first main signal center frequency being the main signal center frequency and a first main signal bandwidth being the main signal bandwidth from the first optical waveform information,
the setting the set center frequency to the main signal center frequency includes setting the set center frequency to the first main signal center frequency, and
the setting the set bandwidth to the main signal bandwidth includes setting the set bandwidth to the first main signal bandwidth.

Supplementary Note 11

The wavelength multiplexing method according to Supplementary Note 8, further including:
generating an optical detection signal when an input of the optical signal is detected; and
switching an optical path of the optical signal between a first optical path in which the optical signal is caused to pass in the pass band and a second optical path different from the first optical path, wherein
the switching the optical path includes switching the optical path from the first optical path to the second optical path when the optical detection signal is received, and
the generating the optical waveform information includes generating second optical waveform information being the optical waveform information from the optical signal that passes in the second optical path.

Supplementary Note 12

The wavelength multiplexing method according to Supplementary Note 11, wherein
the calculating the main signal center frequency and the main signal bandwidth includes calculating a second main signal center frequency being the main signal center frequency and a second main signal bandwidth being the main signal bandwidth from the second optical waveform information,
the setting the set center frequency to the main signal center frequency includes setting the set center frequency to the second main signal center frequency,
the setting the set bandwidth to the main signal bandwidth includes setting the set bandwidth to the second main signal bandwidth, and
the switching the optical path includes switching the optical path from the second optical path to the first optical path after the set center frequency is set to the second main signal center frequency and the set bandwidth is set to the second main signal bandwidth.

Supplementary Note 13

The wavelength multiplexing method according to any one of Supplementary Notes 8 to 12, wherein
the calculating the main signal center frequency and the main signal bandwidth includes deriving a rising frequency and a falling frequency in an optical waveform of the optical signal from the optical waveform information and calculating the main signal center frequency and the main signal bandwidth from the rising frequency and the falling frequency.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100, 200, 300 Wavelength multiplexing device
110, 210, 310 Wavelength multiplexing unit
120, 220, 320 Optical monitoring unit
130, 230, 330 Calculation unit
140, 240, 340 Control unit
211, 311 Input port
212, 312 Output port
250, 350 Optical detection unit
360 Optical switch unit
361 First optical path
362 Second optical path

What is claimed is:

1. A wavelength multiplexing device comprising:
a wavelength multiplexer configured to cause input light being input from each of a plurality of input ports receiving an optical signal, to pass in a pass band determined by a set center frequency and a set bandwidth, and output the light from an output port;
an optical monitor configured to measure optical power of the optical signal for each optical frequency and generating optical waveform information;
a calculator configured to calculate a main signal center frequency being a center frequency of the optical signal and a main signal bandwidth being a bandwidth of the optical signal from the optical waveform information;
a controller configured to set the set center frequency to the main signal center frequency and set the set bandwidth to the main signal bandwidth; and
an optical detector configured to detect an optical detection signal when an input of the optical signal is detected, wherein,
when the optical detection signal is received, the controller cancels limits of the set center frequency and the set bandwidth, and extends the pass band to a maximum pass band within a permissible range, and
the optical monitor generates first optical waveform information being the optical waveform information, from the optical signal that passes through the wavelength multiplexer in the maximum pass band.

2. The wavelength multiplexing device according to claim 1, wherein
the calculator calculates a first main signal center frequency being the main signal center frequency and a first main signal bandwidth being the main signal bandwidth from the first optical waveform information, and
the controller sets the set center frequency to the first main signal center frequency, and sets the set bandwidth to the first main signal bandwidth.

3. The wavelength multiplexing device according to claim 1, wherein
the calculator derives a rising frequency and a falling frequency in an optical waveform of the optical signal from the optical waveform information, and calculates the main signal center frequency and the main signal bandwidth from the rising frequency and the falling frequency.

4. The wavelength multiplexing device according to claim 1, wherein the wavelength multiplexer includes a wavelength selectable switch including a spatial light modulator formed of a liquid crystal.

5. A wavelength multiplexing device comprising:
a wavelength multiplexer configured to cause input light being input from each of a plurality of input ports receiving an optical signal, to pass in a pass band determined by a set center frequency and a set bandwidth, and output the light from an output port;
an optical monitor configured to measure optical power of the optical signal for each optical frequency and generating optical waveform information;
a calculator configured to calculate a main signal center frequency being a center frequency of the optical signal and a main signal bandwidth being a bandwidth of the optical signal from the optical waveform information;
a controller configured to set the set center frequency to the main signal center frequency and set the set bandwidth to the main signal bandwidth;
an optical detector configured to generate an optical detection signal when an input of the optical signal is detected; and
an optical switch configured to switch an optical path of the optical signal between a first optical path toward the wavelength multiplexer and a second optical path toward the optical monitor, wherein,
when the optical detection signal is received, the optical switch switches the optical path from the first optical path to the second optical path, and
the optical monitor generates second optical waveform information being the optical waveform information from the optical signal that passes in the second optical path.

6. The wavelength multiplexing device according to claim 5, wherein
the calculator calculates a second main signal center frequency being the main signal center frequency and a second main signal bandwidth being the main signal bandwidth from the second optical waveform information,
the controller sets the set center frequency to the second main signal center frequency, and sets the set bandwidth to the second main signal bandwidth, and
the optical switch switches the optical path from the second optical path to the first optical path after the set center frequency is set to the second main signal center frequency, and the set bandwidth is set to the second main signal bandwidth.

7. A wavelength multiplexing method comprising:
measuring optical power of an optical signal for each optical frequency and generating optical waveform information;
calculating a main signal center frequency being a center frequency of the optical signal and a main signal bandwidth being a bandwidth of the optical signal from the optical waveform information;
setting a set center frequency to the main signal center frequency and setting a set bandwidth to the main signal bandwidth when the optical signal is caused to pass in a pass band determined by the set center frequency and the set bandwidth and is multiplexed;
generating an optical detection signal when an input of the optical signal is detected; and
cancelling limits of the set center frequency and the set bandwidth and extending the pass band to a maximum pass band within a permissible range when the optical detection signal is received, wherein the generating the optical waveform information includes generating first optical waveform information being the optical waveform information from the optical signal that passes in the maximum pass band.

8. The wavelength multiplexing method according to claim 7, wherein
the calculating the main signal center frequency and the main signal bandwidth includes calculating a first main signal center frequency being the main signal center frequency and a first main signal bandwidth being the main signal bandwidth from the first optical waveform information,
the setting the set center frequency to the main signal center frequency includes setting the set center frequency to the first main signal center frequency, and
the setting the set bandwidth to the main signal bandwidth includes setting the set bandwidth to the first main signal bandwidth.

9. The wavelength multiplexing method according to claim 7, wherein
the calculating the main signal center frequency and the main signal bandwidth includes deriving a rising frequency and a falling frequency in an optical waveform of the optical signal from the optical waveform information and calculating the main signal center frequency and the main signal bandwidth from the rising frequency and the falling frequency.

\* \* \* \* \*